(12) United States Patent
Rajchel et al.

(10) Patent No.: US 6,490,027 B1
(45) Date of Patent: Dec. 3, 2002

(54) REDUCED NOISE OPTICAL SYSTEM AND METHOD FOR MEASURING DISTANCE

(76) Inventors: Suzanne K. Rajchel, 319 W. Forest Ave., Wheaton, IL (US) 60187; Michael G. Ressl, 116 51st St., Western Springs, IL (US) 60558

( * ) Notice: Subject to any disclaimer, the term of this patent is extended or adjusted under 35 U.S.C. 154(b) by 0 days.

(21) Appl. No.: 09/626,360

(22) Filed: Jul. 27, 2000

Related U.S. Application Data

(60) Provisional application No. 60/145,811, filed on Jul. 27, 1999.

(51) Int. Cl.[7] ................................................. G01C 3/08
(52) U.S. Cl. ........................ 356/4.01; 356/28; 356/28.5
(58) Field of Search .............................. 356/4.01, 5.15, 356/28, 28.5, 141.1

(56) References Cited

U.S. PATENT DOCUMENTS

| | | | | |
|---|---|---|---|---|
| 3,723,004 A | * | 3/1973 | Brayton | 356/28 |
| 3,781,111 A | * | 12/1973 | Fletcher et al. | |
| 4,108,551 A | * | 8/1978 | Weber | |
| 5,253,033 A | * | 10/1993 | Lipchak et al. | |
| 5,612,781 A | * | 3/1997 | Ohtomo et al. | 356/152.2 |
| 5,790,242 A | * | 8/1998 | Stern et al. | 356/4.04 |
| 5,877,856 A | * | 3/1999 | Fercher | 356/345 |
| 6,134,010 A | * | 10/2000 | Zavislan | 356/364 |

* cited by examiner

Primary Examiner—Stephen C. Buczinski
(74) Attorney, Agent, or Firm—Cardinal Law Group

(57) ABSTRACT

A reduced noise optical system is provided for use in measuring distance, range-finding and scanning. The system comprises at least one lens, at least one receiver operably positioned to receive a return beam of light reflected from an object and a limiting aperture operably aligned with the lens to limit the signal, and thus the noise, transmitted in the return beam.

18 Claims, 5 Drawing Sheets

REDUCED NOISE OPTICAL SYSTEM AND METHOD FOR MEASURING DISTANCE

RELATED APPLICATION

This application claims the benefit of U.S. Provisional Patent Application Ser. No. 60/145,811, entitled "Improved Optical System for Noise Reduction in Aiming, Range-finding and Scanning Systems," filed Jul. 27, 1999, the entire disclosure of which is incorporated herein by reference.

FIELD OF THE INVENTION

This invention relates to optical systems for use in distance measurement or range-finding devices. More particularly, this invention relates to single beam optical systems in range-finding and measurement devices that have improved signal-to-noise ratios.

BACKGROUND OF THE INVENTION

Range-finders are commonly used to determine distances. In current applications of range-finders, the size, weight and cost of the range-finding system may typically be ignored. Conventional range-finding systems are used to determine distances for agriculture, aviation and nautical applications.

Although these systems are adequate for current uses, simultaneous reductions in all four dimensions of size, weight, complexity and cost could enhance distance measuring or range-finding systems for broader or mass market uses. Furthermore, existing dual beam systems also use costly, unwieldy methods for reducing signal-to-noise ratio of the received data signal.

These systems typically employ software applications to overcome signal degradation effects. These software applications require extending the data acquisition interval through signal averaging or other signal conditioning techniques. Such increases in the data acquisition intervals limit the usefulness of such devices.

Optical spatial filtering techniques have previously been used to improve the signal to noise ratio of holographic and microscopic systems (e.g. so-called "confocal" microscopes). However, the application of these techniques to distance measuring or range-finding systems for the purposes of reducing the overall system size, weight, complexity and cost would be desirable.

It would further be desirable to provide a means and method for reducing noise within a range-finding system at a low cost.

It would further be desirable to provide a means and method for reducing noise within a range-finding system that is compatible with optical systems that integrate other optical technologies.

DETAILED DESCRIPTION OF THE PRESENTLY PREFERRED EMBODIMENTS

Figure 1:
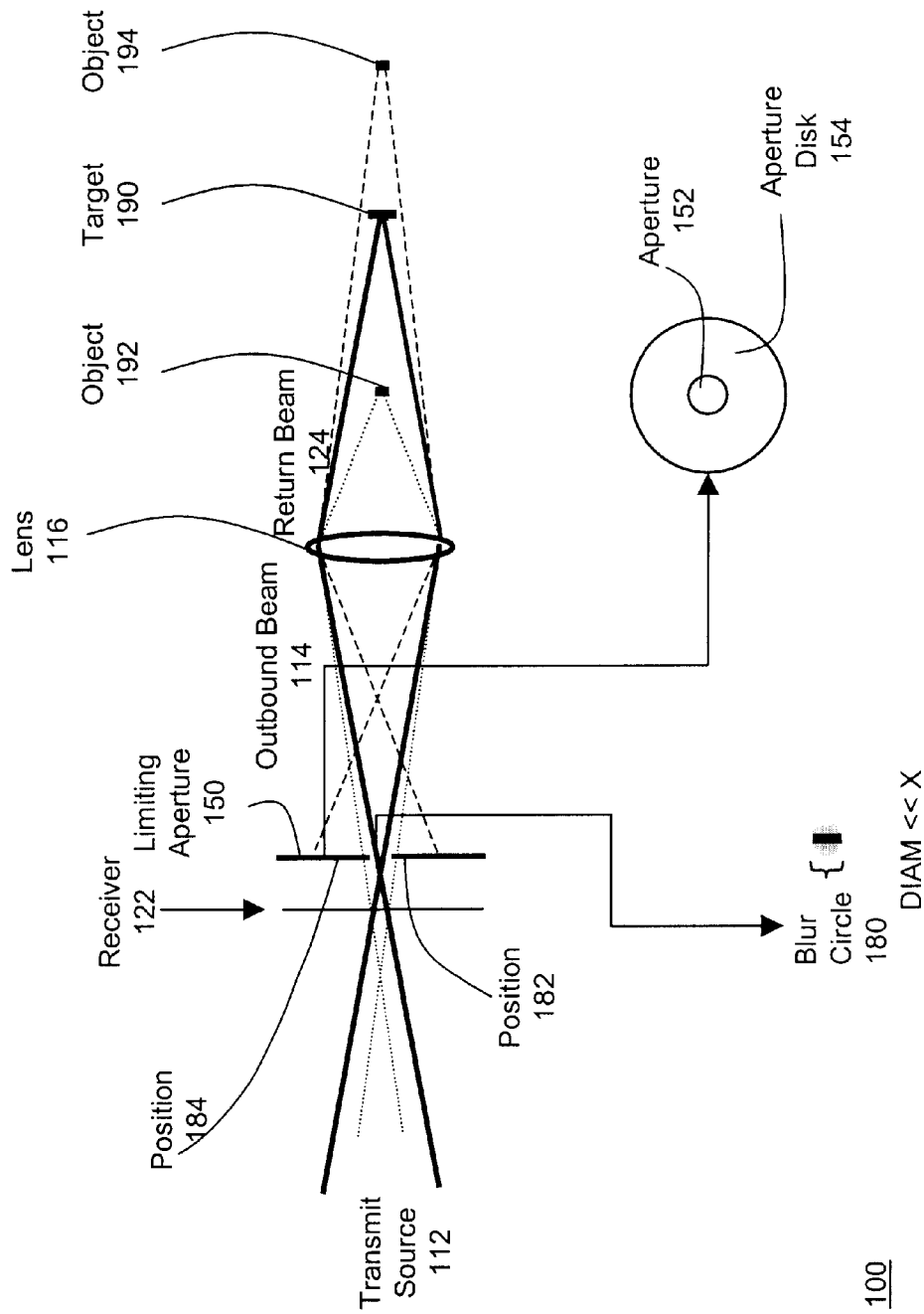
FIG. 1 is a schematic view of one embodiment of an optical system of the present invention.

Referring now to FIG. 1, one embodiment of a reduced noise optical system 100 is shown. Such an optical system may be used for distance measurement or range-finding purposes. Optical system 100 comprises a transmit source 112 for transmitting an outbound beam of light 114. System 100 also includes a lens 116 through which the beam of light passes. System 100 further comprises a receiver 122 for receiving a return beam of light 124 from a target 190. System 100 also includes a limiting aperture 150. The limiting aperture 150 enables the system 100 to utilize the focusing properties of the transmit source 112 to greatly increase the signal to noise ratio of the data signal or return beam 114 eventually received at receiver 122. In one embodiment, receiver 122 may be a screen. Receiver 122 may be any suitable material for receiving light, such as, for example, semiconductor photo diodes, photo cells, biological optical systems, radio receive systems, photo tubes and microwave receivers.

In system 100, transmit source 112 may emit a linearly polarized outbound beam 114 of light. Transmit source 112 may be any source which emits light, such as, for example, a laser diode. It is also typical, though not required, that the emitted polarization type of the light 114 be fixed with respect to time, as is the orientation of the polarization. Alternatively, transmit source 112 may emit non-polarized or non-linearly polarized light 114, but this will increase loss of light 114, 124 from the system.

"Light" may include but is not limited to: non-polarized light; polarized light of elliptical, circular, linear or other orientation; radiation from sources emitting electromagnetic radiation in other than visible portions of the electromagnetic spectrum or any source of electromagnetic radiation that can emit polarized radiation. Polarized light may be defined as light in which the motion of the wave of light is confined to one plane or one direction.

Outbound light beam 114 next passes through lens 116 along outbound beam path 118. The outbound beam 114 hits a target 190 (an object in space such as, for example, a building, a bar code on the building or an identification unit mounted on the building). The outbound beam 114 is reflected from the target and returns to the system 100 via the same beam path 118. The transmitted light 114 is now return beam 124 which returns to the receiver 122.

Return beam 124 now passes through lens 116. In alternative embodiments of the invention, return beam 124 may pass through a second lens. Return beam 124 may also return to receiver 122 along a different beam path.

Return beam includes reflected light from target 190. However return beam 124 also includes light reflected from objects at positions 192 and 194.

Figure 2:
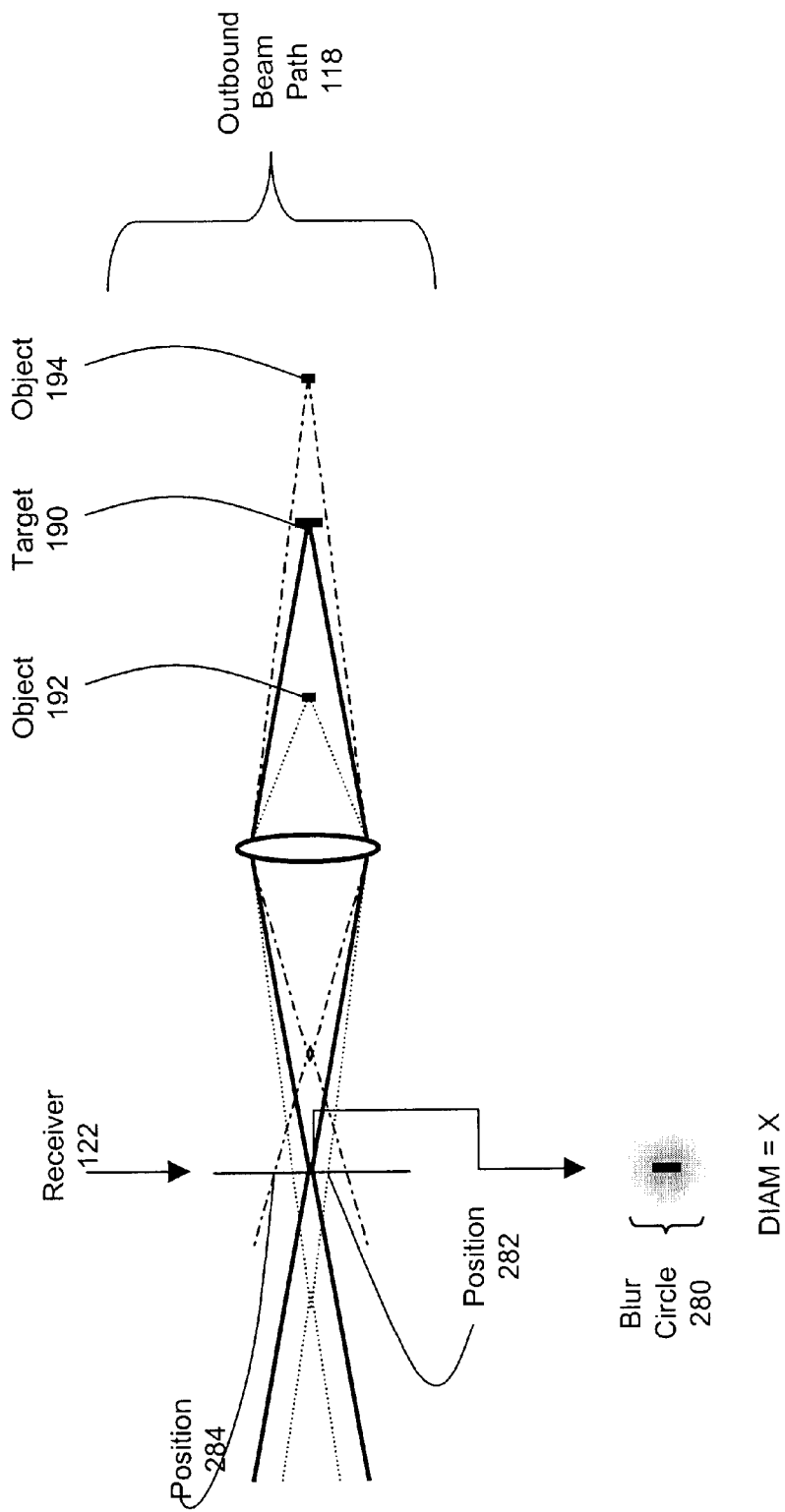
FIG. 2 is a schematic view of a prior art optical system.

As seen in FIGS. 1 and 2, once outbound light beam 114 leaves lens 116 on the way to target 190, light beam 114 may encounter blockages in the beam path 118 such as the blockage shown at 192. Additionally, return beam 124 may also encounter other objects in the beam path 118 such as the object shown at 194. These blockages greatly reduce the ability of receiver 122 to efficiently collect and control the return beam 124.

Examples of such blockages could be rain droplets, windows, trees, etc. that are situated between the transmit source 112 and the target 190. These blockages serve to obscure the target and produce erroneous signals at the receiver 122. Furthermore, since the beam path 118 may pass through or past such obstructions more than once, the effects of these blockages on the outbound beam 114 or return beam 124 may be doubled. As FIG. 2 shows, an image of blockage 192 may be received by receiver 122 at position 282, thereby blurring the image of target 190 received by receiver at position 280.

It is also possible that erroneous signals could be produced by structures, vehicles, rain, other weather conditions or other objects existing spatially beyond the target position relative to the transmit system. One such example is shown as object 194 in beam path 118. The proximity of such an object 194 to the beam path 118 may allow the object 194 to be misidentified by the receiver 122 as the target 190. As with blockage 192, object 194 may also create scattered light along the beam path 118. This scattered light may raise the noise floor and lower the signal to noise ratio of the received data signal. As FIG. 2 shows, an image of object 194 may be received by receiver 122 at position 284, thereby blurring the image of target 190 received by receiver at position 280.

The reflected optical beams from 192 and 194 at these different positions creates a blur of light at the receiver 122. Thus the image of target 190 shown in FIG. 2 at 280 is blurry. Blur circle 280 may be an image of target 190 as received by receiver 122. Blur circle 280 may be assigned a diameter X. The diameter of this blur circle is dependent on the distance of the different obstructions and their receiver-perceived relative intensity.

Referring to FIG. 1, blur circle 180 is shown to have a diameter which is less than X. Blur circle 180 may be an image of target 190 as received by receiver 122 in the optical system 100 of the present invention. The diameter of this blur circle is dependent on the distance of the different obstructions and their receiver-perceived relative intensity.

The diameter of blur circle 180 is reduced in size compared to the diameter of blur circle 280 because optical system 100 incorporates limiting aperture 150. Significant noise power may be encompassed by the blur circle. The frequency mapping of such noise typically indicates that higher frequency components of light are bent at greater angles and are therefore more readily eliminated from the detector's collection by insertion of a limiting aperture.

System 100 incorporates spatial filtering of the return beam 124 to reduce unwanted, spurious noise components from the optical data signal before the signal is converted to an electrical signal by receiver 122.

Limiting aperture 150 is any appropriate size for system 100. In one embodiment, limiting aperture 150 comprises an aperture or opening 152 within an aperture disk 154. Aperture 150 within system 100 is optically placed so as to reduce the diameter X of the blur circle on while simultaneously limiting the noise spectrum incident on receiver 122. The maximum throughput of the aperture occurs for those rays from objects at a particular distance that come to a focused spot at the aperture. Other rays emanating from other objects, at other distances, will be attenuated (except for those that propagate directly on-axis) by a great extent. For example, in FIG. 1, aperture 150 limits the rays emanating from blockage 192 at position 182. Aperture 150 also limits the rays emanating from object 194 at position 184.

In one embodiment, limiting aperture 150 is at or near the focal point of the lens 116. The position of limiting aperture 150 is intended to optimize the ratio between the spot size of target 190 and the spot size of a blockage 192 or an object 194. Such positioning allows for maximum filtering efficiency. For example, if target 190 is idealized as a dot in space, limiting aperture 150 may be positioned so that its focused spot size would be very small at receiver 122. With such positioning, the diameter of the unintended objects 192, 194 will be larger than that of the target 190.

The performance increase from use of aperture 150 allows the use of smaller, less expensive, optics as well as reducing the need for error correcting software control algorithms that, in prior art, limit the data acquisition speed of the system.

Light sources typically used in aiming, range-finding and scanning systems display advantageous characteristics that allow for the design of optimized transmission systems. Typically such light sources emit polarized light, of elliptical, circular or linear orientation or a mixture thereof. Furthermore it is typical, though not required, that the emitted polarization type or orientation of the polarization is fixed with respect to time. Such sources may emit un-polarized light. This invention may be embodied in a way so as to reduce any dependence on the polarization of the light sources. Alternatively, it may be advantageous to embody the invention to take advantage of the polarization properties of the transmit sources.

Figure 3:
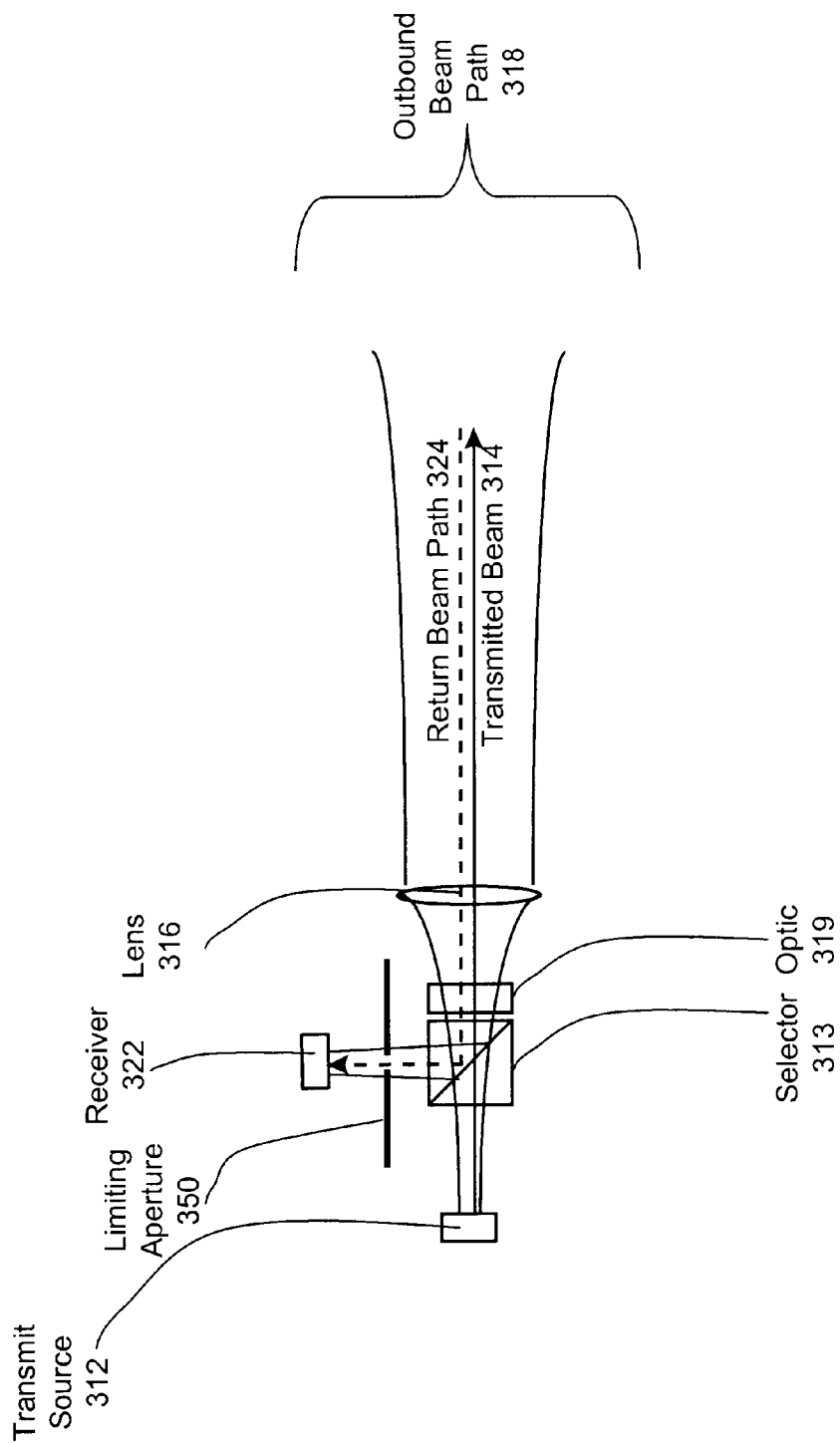
FIG. 3 is a schematic view of a second embodiment of an optical system of the present invention as used in a single-beam range-finding or sighting system.

For example, FIG. 3 shows a single-beam embodiment of an optical system 300 in accordance with the present invention. Optical system 300 takes advantage of the polarization properties of transmit source 312 to reduce the size of the system. Transmit source 312 emits a linearly polarized outbound beam 314 of light. Transmit source 312 may be any source which emits light, such as, for example, a laser diode. It is also typical, though not required, that the emitted polarization type of the light 314 be fixed with respect to time, as is the orientation of the polarization. Alternatively, transmit source 312 may emit non-polarized or non-linearly polarized light 314, but this will increase loss of light 314, 324 from the system.

Outbound light 314 then passes through polarization selector optic 313. This optic 313 is constructed and positioned so as to minimize loss and aberration of the transmitted beam 314. Polarization selector optic 313 may be any optic that is capable of differentiating between several polarizations of light. Polarization selector optic 313 may thus be an optic capable of selecting at least one particular polarization; it may further allow light of other polarizations to pass through it unaltered in polarization state. For example, in the embodiment of FIG. 3, the polarized light 314 of transmit source 312 passes unaltered through the polarization selector optic 313. Depending on the transmit source 312 and the polarization selector optic 313 used, the selector 313 can also serve the purpose of creating a linearly polarized beam at its output face. In these cases for example, transmit source 312 would emit non-polarized light 314 which, upon passing through selector 313, would become polarized.

In the embodiment of FIG. 3, light 314 next encounters the retardation plate optic 319. This optic 319 is constructed and aligned to produce minimum reflections at its surface and to minimize transmission losses to the transmitted beam 314. Retardation plate optic 319 could be any optic that is capable of rotating light (e.g. beam 314), or more particularly, the polarization of light in a desired direction.

The transmitted beam 314 next passes through lens 316 along outbound beam path 318. The outbound beam 314 hits a target (an object in space such as, for example, a building, a bar code on the building or an identification unit mounted on the building). The outbound beam 314 is reflected from the target and returns to the system 300 via the same beam path 318. Incorporation of polarization selector optic 313 and retardation plate 319 allows a single beam path to be used for both transmitting and receiving light.

Light 114 is now reflected light 124. Return beam 324 now passes through lens 316. Next return beam 324 passes through the retardation plate 319, which introduces another wave front phase retardation on the return beam 324.

The return beam 324 now encounters the polarization selector 313. Since the polarization state of the return beam 124 is now different to that originally transmitted by the polarization selector 313 in the form of the outbound beam 314, the return beam 324 is directed by polarization selector 313 towards the receiver 322.

Before reaching the receiver 322, the return beam encounters limiting aperture 350. Limiting aperture 350 may be placed in any position in the return beam path 324 between lens 316 and receiver 322. In one embodiment, limiting aperture 350 is at or near the focal point of the lens 316. The position of limiting aperture 350 is intended to optimize the ratio between the spot size of a target and the spot size of an object blocking the target (such as blockage 192) or an object behind the target (such as object 194).

Receiver 322 is any suitable substrate for receiving light, including for example, a silicon photo diode, photo cells, biological optical systems, radio receive systems, photo tubes and microwave receivers.

Figure 4:
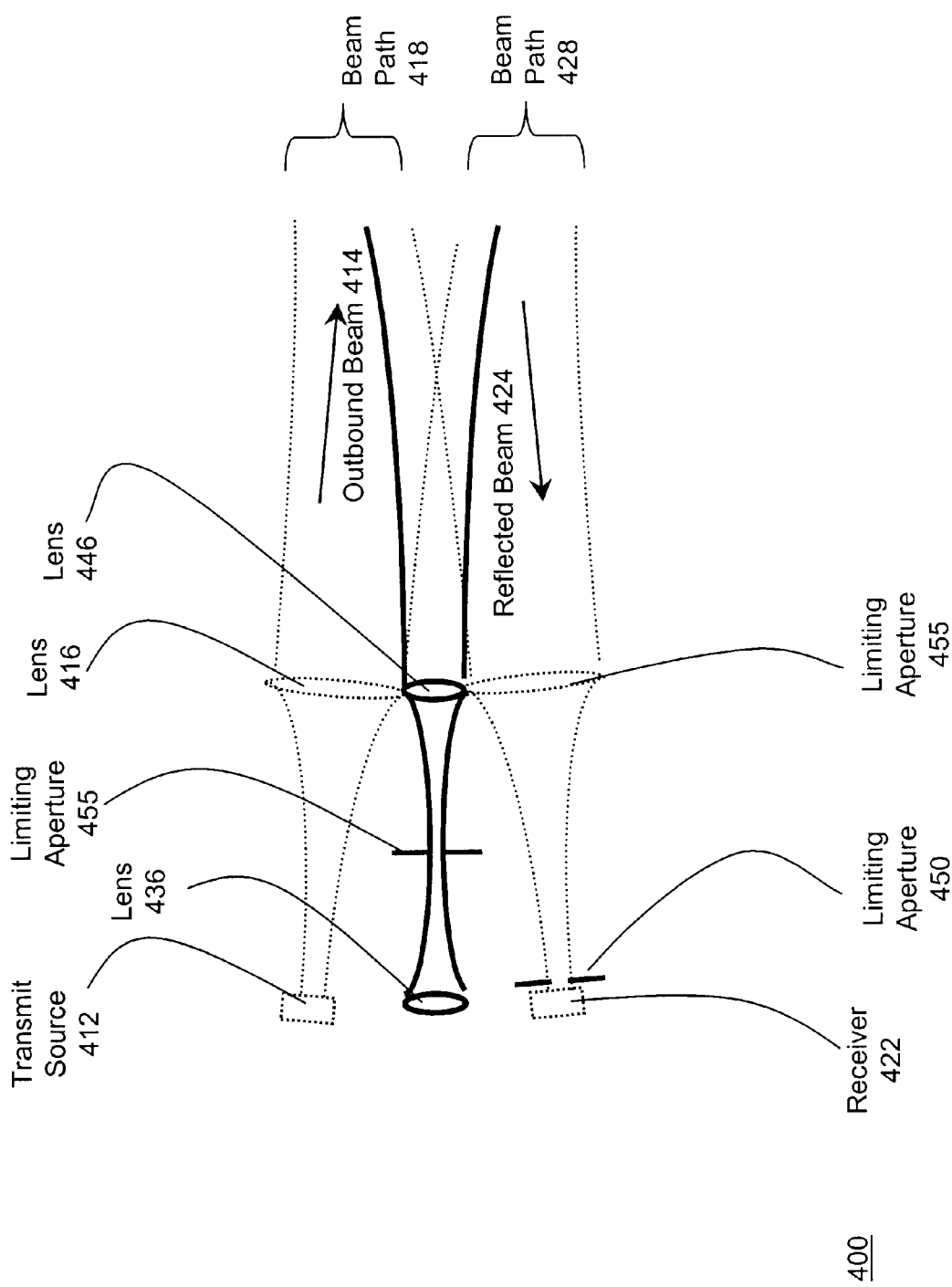
FIG. 4 is a schematic view of a third embodiment of an optical system of the present invention as used in a dual-beam range-finding or sighting system.

FIG. 4 shows a schematic view of another embodiment of an optical system 400 in accordance with the present invention. Such an optical system may be used in a dual-beam range-finding or sighting system.

As seen in FIG. 4, the optical system 400 of the present invention includes one beam path 418 for a transmit system (comprising one transmit source 412 transmitting one beam 414 through one lens 416) and another beam path 428 for a receiving system (comprising a reflected beam 424 passing through a second lens 426 and being received by a receiver 422).

In the dual beam system 400 of FIG. 4, the transmit source 412 of the transmit system emits light that travels through the lens 416. This light becomes the collimated outbound beam 414. The outbound beam 414 hits a target (an object in space such as, for example, a building, a bar code on the building or an identification unit mounted on the building). The outbound beam is reflected from the target and returns to the receiver 422 of the receiving system via beam path 428. As this reflected beam 424 passes through lens 426, it is refracted so that it comes to a focus at receiver 422. Limiting aperture 450 is placed as shown within system 400.

System 400 may also include a sighting system with lens 436 and lens 446. A second limiting aperture 455 may be placed as shown in order to reduce aiming error on any of the detectors in the system. In a typical sighting system, the system is visual and lens 436 and lens 446 may be used in a manner similar to a telescope as is known in the art. However, in a mechanical sighting system, for example, lens 436 may also serve as a receiver in a manner similar to receiver 422. Output from such a receiver may be sent automatically to a detection system (not shown.)

Figure 5:
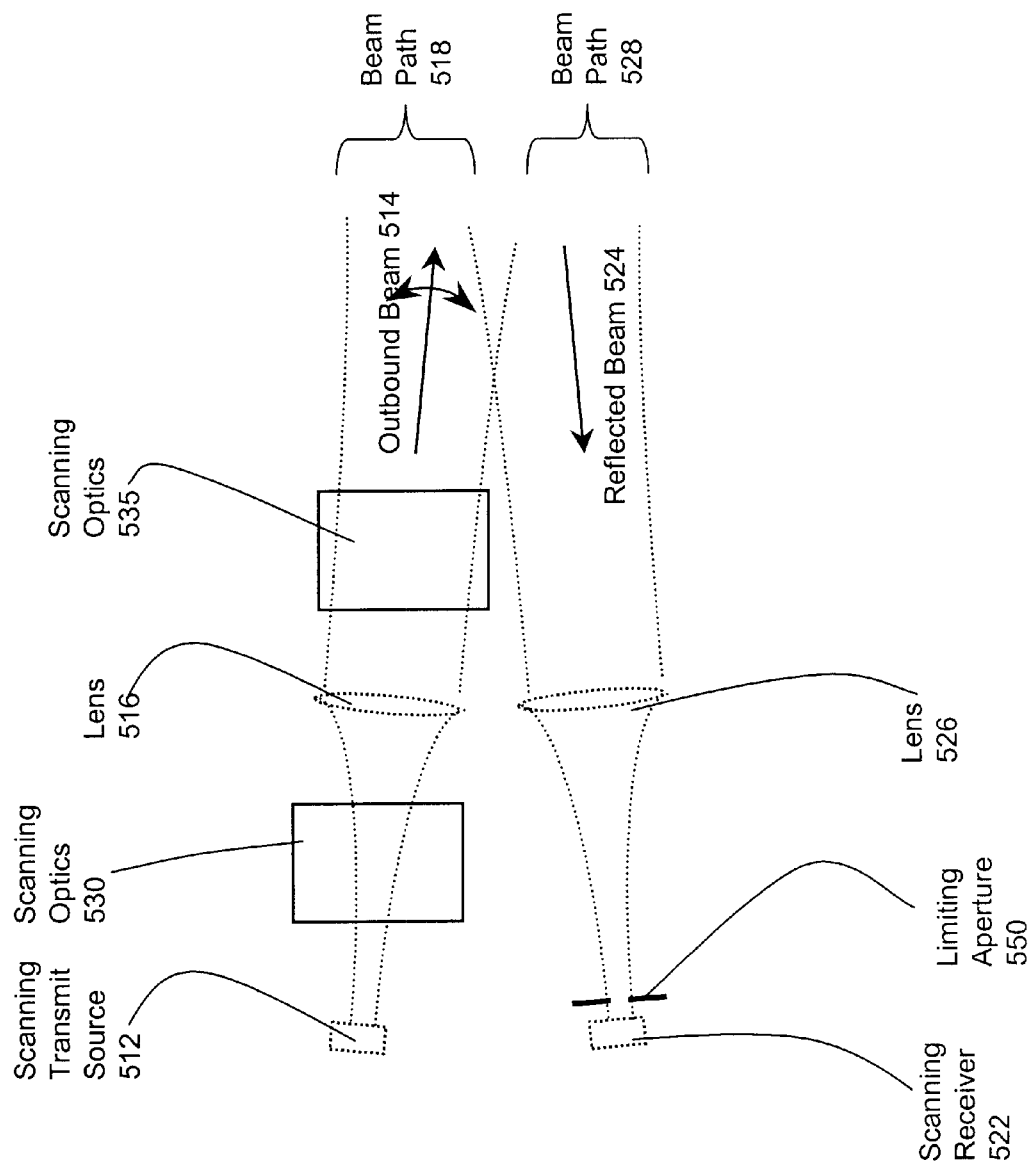
FIG. 5 is a schematic view of another embodiment of an optical system of the present invention as used in a in a scanning system.

FIG. 5 shows a schematic view of another embodiment of an optical system 500 in accordance with the present invention. Such an optical system may be used in a scanning system.

As seen in FIG. 5, the optical system 500 of the present invention includes one beam path 518 for a transmit system, which comprises one scanning transmit source 512 transmitting one beam 514 through a first beam scanning optics 530, through a first lens 516 and finally through a second beam scanning optics 535. Optical system 500 also includes another beam path 528 for a receiving system, which comprises a reflected beam 524 passing through a second lens 526 and being received by a scanning receiver 522.

In the dual beam system 500 of FIG. 5, the transmit source 512 emits light that travels through the scanning optics 530, 535 and through lens 516. This light becomes the collimated outbound beam 514. The outbound beam 514 hits a target (an object in space such as, for example, a building, a bar code on the building or an identification unit mounted on the building). The outbound beam is reflected from the target and returns to the receiver 522 of the dual beam system 500 via beam path 528. As this reflected beam 524 passes through lens 526, it is refracted so that it comes to a focus at receiver 522. Limiting aperture 550 is placed as shown.

The optical system of the present invention may be used in aiming, range-finding and scanning systems. Such systems are required to be as small, high performance, lightweight, and low cost as possible. The optical system 100 in accordance with the present invention reduces the complexity and cost of presently available optics-based aiming, range-finding and scanning systems, while simultaneously improving the overall system performance, data acquisition speed, manufacturability, and decreasing the size, weight, and cost.

The optical systems of the present invention allow simultaneous reductions in all four dimensions of size, weight, complexity and cost. Range-finding systems incorporating the optical systems of the present invention are therefore made more attractive for broader, or mass market uses. The optical systems of the present invention can also be used in conjunction with technologies of range-finding and compass readings for determining relative position and, with the absolute positioning of GPS, in order to determine the location of remote structures.

Furthermore, the systems of the present invention offer the possibility of significantly reducing range finding system manufacturing costs by lowering parts numbers and the requisite fixtures for those eliminated parts. Such low cost, reduced size, reduced complexity, minimum weight systems could conceivably be used by police, fire, ambulance, or any other type of emergency service, overnight delivery services, postal service, utility services, pizza delivery, meter-reading, golf courses, railroads, military vehicles, as well as private use.

Other potential applications include, but are not limited to: enhanced or mobile 911; enhanced directory services; air-traffic control; automobile and transportation; automated mass transit; public and private telecommunications systems; construction; geophysical and geologic industries; entertainment; medical; sports; manufacturing; mapping; meteorological applications; forestry management; agricultural industry; mining industry; aviation and nautical industries; HVAC systems; enhanced earth-moving systems; warehouse inventory management; ESDA haz-mat registry; tourism; mobile Internet access; and integration of this system with other systems.

It should be appreciated that the embodiments described above are to be considered in all respects only illustrative and not restrictive. The scope of the invention is indicated by the following claims rather than by the foregoing description. All changes that come within the meaning and range of equivalents are to be embraced within their scope.

We claim:

1. A range-finder comprising:

a range-finder housing;

a transmit source for transmitting light operably attached to the housing;

a first lens operably aligned with the transmit source to allow an outbound beam of light transmitted from the transmit source to pass through the first lens;

a first receiver operably positioned within the housing to receive a return beam of light reflected from an object, a second lens operably aligned with the first receiver to allow the return beam of light to pass through the second lens before reaching the first receiver;

a first limiting aperture operably aligned with the first receiver to improve a signal to noise ratio of the return beam;

a third lens operably positioned within the housing to receive a sighting beam of light reflected from the object;

a fourth lens operably aligned with the third lens to allow the sighting beam of light to pass through the fourth lens before the sighting beam reaches the third lens; and a second limiting aperture operably aligned with the third lens to receive the sighting beam before the sighting beam reaches the third lens.

2. The range-finder of claim 1 further comprising:

a second receiver operably positioned within the housing to receive a sighting beam of light reflected from the object, wherein the second receiver is operably aligned with the fourth lens to allow the sighting beam of light to pass through the fourth lens before the sighting beam reaches the second receiver.

3. A scanner comprising:

a housing;

a scanning transmit source for transmitting light operably attached to the housing, the scanning transmit source operably adapted to differentiate between an outbound beam of light and a return beam of light;

a first lens operably aligned with the transmit source to allow the outbound beam of light transmitted from the scanning transmit source to pass through the first lens;

a first scanning optics operatively aligned with the first lens to allow the outbound beam of light transmitted from the scanning transmit source to pass through the first scanning optics before passing through the first lens;

a second scanning optics operatively aligned with the first lens to allow the outbound beam of light transmitted from the scanning transmit source to pass through the second scanning optics after passing through the first lens;

a scanning receiver operably positioned within the housing to receive the return beam of light reflected from an object;

a second lens operably aligned with the scanning receiver to allow the return beam of light to pass through the second lens before reaching the scanning receiver; and a first limiting aperture operably aligned with the scanning receiver to improve a signal to noise ratio of the return beam of light.

4. A reduced noise optical system for distance measurement, comprising:

a lens operably aligned with a transmit source in a first alignment, wherein the first alignment allows the lens to collimate an outbound beam of light transmitted from the transmit source through the lens;

a receiver operably aligned with the lens in the first alignment to receive a return beam of light reflected from an object in a first instance;

a limiting aperture operably aligned with the lens in the first alignment to improve the signal to noise ratio of the return beam, wherein the lens also focuses the return beam;

wherein the transmit source is a polarization selector operably aligned with the receiver to differentiate between the outbound and return beams based on polarization of the light.

5. The system of claim 4 further comprising:

a retardation plate operably aligned with the lens to allow the outbound beam to pass through the retardation plate and through the lens.

6. The system of claim 5 further comprising:

a selector positioned to allow the outbound beam to pass through the selector before passing through the retardation plate.

7. The system of claim 5 wherein the return beam passes through the retardation plate in a second instance before reaching the receiver.

8. The system of claim 4 wherein the transmit source is selected from the group consisting of: laser sources, incandescent sources, flourescent sources, microwave sources, semiconductor sources, maser sources and plasma sources.

9. The system of claim 4 wherein the receiver is selected from the group consisting of: semiconductor photo diodes, photocells, biological optical systems, radio receive systems, phototubes and microwave receivers.

10. A reduced noise optical system for scanning, comprising:

a lens operably aligned with a transmit source in a first alignment, wherein the lens collimates an outbound beam of light transmitted from the transmit source through the lens;

at least one scanning optic operably aligned with the lens in the first alignment;

a receiver operably aligned with the lens in the first alignment to receive a return beam of light reflected from an object, wherein the lens focuses the return beam;

a limiting aperture operably aligned with the lens to improve the signal to noise ratio of the return beam; and a selector operably aligned with the receiver to differentiate between the outbound and return beams based on polarization of the beams.

11. The system of claim 10 wherein the transmit source is the selector.

12. The system of claim 10 further comprising:

a retardation plate operably aligned with the lens to allow the outbound beam of light transmitted from the transmit source to pass through the retardation plate and through the lens.

13. An optical system for distance measurement, comprising:

transmitting means for transmitting an outbound beam of light operably aligned with differentiating means for differentiating between the outbound beam and an inbound beam;

noise reducing means for improving a signal to noise ratio in the inbound beam;

rotating means for rotating polarization of at least one beam of light;

collimating means for collimating the outbound beam and focusing the inbound beam; and receiving means for receiving the inbound beam.

14. The system of claim 13 wherein the transmitting means and the differentiating means are the same.

15. An apparatus for measuring distance comprising:

a housing;

a transmit source for transmitting light operably attached to the housing;

a retardation plate for rotating polarization of light operably attached to the housing, wherein an inbound beam of light reflected from an object passes through the retardation plate in a first instance;

a lens operably aligned with the retardation plate to collimate an outbound beam of light transmitted from the transmit source and to focus the inbound beam, a receiver operably positioned within the housing to receive the inbound beam, wherein the inbound beam passes through the retardation plate in a second instance before reaching the receiver;

a limiting aperture operably aligned with the receiver to receive the inbound beam before the inbound beam reaches the receiver; and a selector operably aligned with the receiver to differentiate between the inbound and outbound beams of light based on polarization of the inbound and outbound beams.

16. The apparatus of claim 15 wherein the transmit source, the retardation plate, the receiver and the selector are operably positioned in the same plane within the housing.

17. A method of measuring distance comprising the steps of:

transmitting an outbound beam of light, the outbound beam having a first polarization, from a transmit source to a retardation plate;

rotating the first polarization of the outbound beam with the retardation plate;

collimating the outbound beam through a lens to an object;

reflecting the outbound beam from the object back to the lens to focus the reflected beam;

passing the reflected beam from the lens to the retardation plate;

rotating polarization of the reflected beam so that the reflected beam has a second polarization;

selecting the reflected beam which has the second polarization;

sending the selected beam through a limiting aperture;

sending the selected beam from the limiting aperture to a receiver; and measuring the distance to the object based on data from the receiver.

18. A method of transmitting light in a distance-measurement system comprising the steps of:

providing a transmit source substantially transparent to an inbound beam on a substrate;

providing a receiver on the same substrate;

transmitting an outbound beam of light, the outbound beam having a first polarization, from the transmit source to a retardation plate;

rotating the first polarization of the outbound beam with the retardation plate;

further transmitting the outbound beam through a lens to an object so that the lens collimates the outbound beam;

reflecting the outbound beam from the object back to the lens so that the lens focuses the reflected beam;

passing the reflected beam from the lens to the retardation plate;

rotating polarization of the reflected beam so that the reflected beam has a second polarization;

sending the selected beam to the receiver through the transmit source;

sending the selected beam to the receiver through a limiting aperture; and sending the selected beam from the limiting aperture to a receiver.

* * * * *